US011271954B2

(12) United States Patent
Komárek et al.

(10) Patent No.: US 11,271,954 B2
(45) Date of Patent: Mar. 8, 2022

(54) GENERATING A VECTOR REPRESENTATIVE OF USER BEHAVIOR IN A NETWORK

(71) Applicant: Cisco Technology, Inc., San Jose, CA (US)

(72) Inventors: Tomáš Komárek, Frýdek-Místek (CZ); Petr Somol, Marianske Lazne (CZ)

(73) Assignee: CISCO TECHNOLOGY, INC., San Jose, CA (US)

( * ) Notice: Subject to any disclaimer, the term of this patent is extended or adjusted under 35 U.S.C. 154(b) by 361 days.

(21) Appl. No.: 15/650,060

(22) Filed: Jul. 14, 2017

(65) Prior Publication Data

US 2019/0020671 A1   Jan. 17, 2019

(51) Int. Cl.
| | | |
|---|---|---|
| *H04L 29/00* | (2006.01) | |
| *H04L 29/06* | (2006.01) | |
| *G06F 21/55* | (2013.01) | |
| *G06N 20/00* | (2019.01) | |
| *G06F 21/57* | (2013.01) | |

(52) U.S. Cl.
CPC ........ *H04L 63/1425* (2013.01); *G06F 21/552* (2013.01); *G06F 21/577* (2013.01); *G06N 20/00* (2019.01); *H04L 63/0227* (2013.01)

(58) Field of Classification Search
CPC .... H04L 63/1425; G06N 20/00; G06F 21/552
USPC ......................................................... 726/23
See application file for complete search history.

(56) References Cited

U.S. PATENT DOCUMENTS

| | | | |
|---|---|---|---|
| 7,296,288 B1 | 11/2007 | Hill et al. | |
| 8,555,383 B1 | 10/2013 | Marshall et al. | |
| 10,542,017 B1* | 1/2020 | Gates | H04L 63/1416 |
| 2010/0284283 A1 | 11/2010 | Golic et al. | |
| 2012/0210423 A1 | 8/2012 | Friedrichs et al. | |
| 2012/0284791 A1* | 11/2012 | Miller | G06N 7/005 |
| | | | 726/22 |
| 2014/0280898 A1 | 9/2014 | Voit et al. | |

(Continued)

OTHER PUBLICATIONS

Franc, et al., "Learning Detector of Malicious Network Traffic from Weak Labels," Lecture Notes in Computer Science, LNCS, vol. 9286, Aug. 2015, 15 pages.

(Continued)

*Primary Examiner* — Brandon S Hoffman
*Assistant Examiner* — Michael D Anderson
(74) *Attorney, Agent, or Firm* — Edell, Shapiro & Finnan, LLC

(57) ABSTRACT

Presented herein are techniques for classifying devices as being infected with malware based on learned indicators of compromise. A method includes receiving, at a security analysis device, a set of feature vectors extracted from one or more flows of traffic to domains for a given user in a network during a period of time. The security analysis device analyzes the feature vectors included in the set of feature vectors with a set of operators to generate a set of per-flow vectors for the given user. Based on the set of per-flow vectors for the user, the security analysis device generates a single behavioral vector representative of the given user. The security analysis device classifies a computing device associated with the given user based on the single behavioral vector and at least one of known information or other behavioral vectors for other users.

20 Claims, 7 Drawing Sheets

(56) References Cited

U.S. PATENT DOCUMENTS

| | | |
|---|---|---|
| 2016/0352591 A1 | 12/2016 | Sasturkar et al. |
| 2017/0063893 A1* | 3/2017 | Franc .................. H04L 63/0281 |
| 2017/0099314 A1 | 4/2017 | Klatt et al. |
| 2018/0063163 A1 | 3/2018 | Pevny et al. |

OTHER PUBLICATIONS

Pevny, et al., "Discriminative Models for Multi-instance Problems with Tree Structure," Proceedings of the 2016 ACM Workshop on Artificial Intelligence and Security, Oct. 2016, 9 pages.

Bartos, et al., "Learning Invariant Representational for Malicious Network Traffic Detection," 22nd European Conference on Artificial Intelligence, ECAI 2016, Aug.-Sep. 2016, 8 pages.

"Cisco Cognitive Threat Analytics", At-A-Glance, C45-736555-00, Jan. 2016, https://cognitive.cisco.com, 2 pages.

W. Lou, et al., "Cut-and-Pick Transactions for Proxy Log Mining", Advances in Database Technology—EDBT 2002, International Conference on Extending Database Technology, Mar. 24-28, 2002, Prague, Czech Republic, 18 pages.

J. Amores, "Multiple Instance Classification: review, taxonomy and comparative study", Artificial Intelligence, vol. 201, Aug. 2013, 36 pages.

H. Choi, et al., "Detecting Malicious Web Links and Identifying Their Attack Types", WebApps '11: 2nd USENIX Conference on Web Application Development, USENIX Association, Jun. 15-16, 2011, Portland, OR, USA, 12 pages.

J. Ma, et al., "Learning to Detect Malicious URLs", ACM Transactions on Intelligent Systems and Technology, vol. 2, No. 3, Article 30, Apr. 2011, 24 pages.

H. Huang, et al., "A SVM-based Technique to Detect Phishing URLs", Information Technology journal 11 (7): 921-925, 2012, ISSN 1812-5638 / DOI: 10.3923/itj.2012.921.925, 6 pages.

L. Machlica, et al., "Learning detectors of malicious web requests for intrusion detection in network traffic", arXiv:1702.02530v1 [stat.ML], Feb. 8, 2017, 21 pages.

V. Franc, et al., "Learning detectors of malicious network traffic from weak labels", Joint European Conference on Machine Learning and Knowledge Discovery in Databases (ECML PKDD 2015), Sep. 7-11, 2015, Porto, Portugal, 15 pages.

K. Bartos, et al., "Optimized Invariant Representation of Network Traffic for Detecting Unseen Malware Variants", Proceedings of the 25th USENIX Security Symposium, Aug. 10-12, 2016, Austin, TX, ISBN 978-1-931971-32-4, 17 pages.

P. Čech, et al., "Feature extraction and malware detection on large HTTPs data using MapReduce", International Conference on Similarity Search and Applications (SISAP 2016), Oct. 24-26, 2016, Tokyo, Japan, 14 pages.

R. Kohavi, et al., "Wrappers for feature subset selection", Artificail Intelligence, vol. 97, Issues 1-2, Dec. 1997, 52 pages.

S. Raudys, "Feature Over-Selection", SSPR/SPR: Joint IAPR International Workshops on Statistical Techniques in Pattern Recognition (SPR) and Structural and Syntactic Pattern Recognition (SSPR), Hong Kong, China, Aug. 17-19, 2006, 10 pages.

G. Brown, et al., "Conditional Likelihood Maximisation: A Unifying Framework for Information Theoretic Feature Selection", Journal of Machine Learning Research, Jan. 2012, 40 pages.

F. Fleuret, "Fast Binary Feature Selection with Conditional Mutual Information", Journal of Machine Learning Research, Nov. 2004, 25 pages.

T. Gartner, et al., "Multi-Instance Kernels", ICML, vol. 2, Jul. 2002, 8 pages.

J.C. van Gemert, et al., "Visual Word Ambiguity", IEEE Transactions on Pattern Analysis and Machine Intelligence, vol. 32, Issue 7, Jul. 2010, DOI: 10.1109/TPAMI.2009.132, 14 pages.

L. Breiman, "Random Forests", Machine Learning, vol. 45, Issue 1, Oct. 2001, 33 pages.

M. Fernandez-Delgado et al., "Do we Need Hundreds of Classifiers to Solve Real World Classification Problems?", J. Mach. Learn. Res., 15(1):3133-3181, Jan. 2014, 49 pages.

J. Davis, et al., "The Relationship Between Precision-Recall and ROC Curves", ICML '06 Proceedings of the 23rd International Conference on Machine Learning, Jun. 25-29, 2006, Pittsburgh, PA, USA, 8 pages.

J. Dougherty, et al., "Supervised and Unsupervised Discretization of Continuous Features", Machine Learning: proceedings of the twelfth international conference, vol. 12, Jul. 1995, 9 pages.

P. Somol, et al. "Criteria Ensembles in Feature Selection", pp. 304-331, Multiple Classifier Systems: 8th International Workshop, MCS 2009, Reykjavik, Jun. 2009, 10 pages.

* cited by examiner

GENERATING A VECTOR REPRESENTATIVE OF USER BEHAVIOR IN A NETWORK

TECHNICAL FIELD

The present disclosure relates to network analysis and security.

BACKGROUND

Computer networks are becoming increasingly complex, especially as the types and number of applications proliferate over the Internet. Consequently, tracking and preventing viruses and malware, as well as tracking and classifying users, in a computer network is becoming increasingly challenging.

Traditionally, signature-based security devices, firewalls, or anti-viruses have been deployed to track and prevent network threats. However, signature-based algorithms simply compare a byte sequence that has been detected to stored byte-sequences corresponding to known threats, which may be in a database. Thus, if a new threat has not yet been analyzed and recorded into the database, the signature-based algorithms may not identify the new threat. Furthermore, if a threat has the ability to change, the signature-based algorithms may again fail to identify the threat because a current signature of the threat may be different from a stored signature of the same threat that was recorded earlier. Thus, polymorphic malware, zero-day attacks by threats that are novel or previously unseen, or other types of advanced persistent network threats are usually not detected or blocked by signature-based security algorithms.

In view of these issues, in some instances, learning algorithms are now utilized to detect threats. These learning algorithms often use vector representations of user behavior and/or datasets; however, traditional vector representations are not truly representative of the complexities associated with user behavior. For example, traditional vector representations are often not able to represent a complete user traffic structure (by comparison, more sophisticated behavioral models are often not represented as vectors). In other words, there is a fundamental incompatibility between learning algorithms and the underlying structures that represent user behavior. Moreover, learning algorithms are typically trained with training data that includes an extensive number of samples, each of which is assumed to have a reliable label. Consequently, the training, or at least the production of training data with reliable labels, is often prohibitively expensive and time intensive. Additionally or alternatively, the training data may have improper or unreliable labels, at least because each sample may be labeled without context (i.e., without knowledge of other samples in the training data).

DESCRIPTION OF EXAMPLE EMBODIMENTS

Overview

Figure 1:
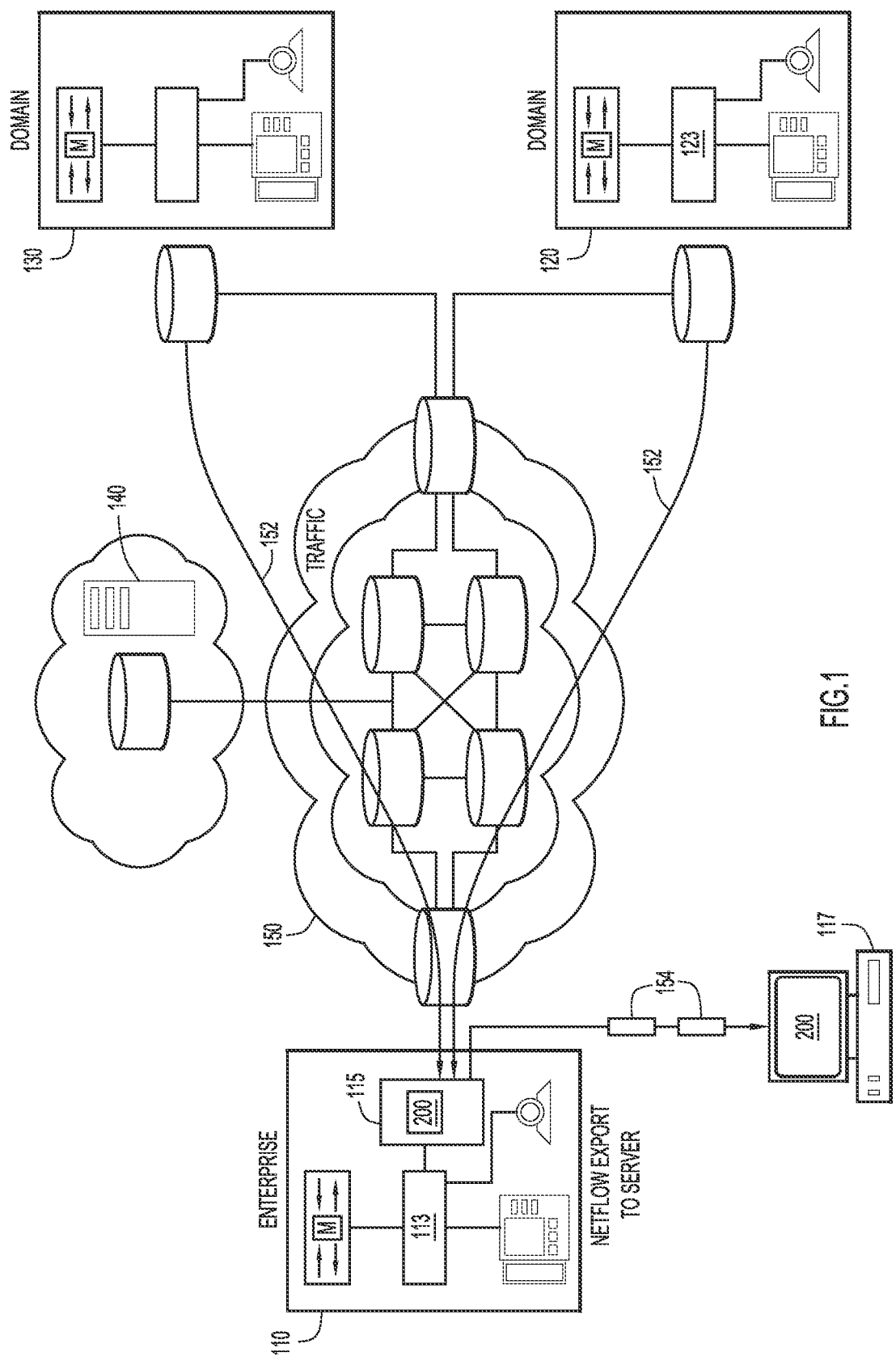
FIG. 1 illustrates an example operating environment in which the techniques presented herein may be employed, according to an example embodiment.

Presented herein are techniques for generating a vector representative of user behavior in a network. These techniques may be embodied as a method, an apparatus, a system, and executable instructions in a computer-readable storage media to perform the method, and may be used, for example, to train various classifiers.

According to one example embodiment, a method includes receiving, at a security analysis device, a set of feature vectors extracted from one or more flows of traffic to domains for a given user in a network during a period of time. The security analysis device analyzes the feature vectors included in the set of feature vectors with a set of operators to generate a set of per-flow vectors for the given user. Based on the set of per-flow vectors for the user, the security analysis device generates a single behavioral vector representative of the given user. The security analysis device classifies a computing device associated with the given user based on the single behavioral vector and at least one of known information or other behavioral vectors for other users.

Example Embodiments

The techniques presented herein generate a single vector that is representative of complex user behavior in a network on the basis of activity of a computing device or applications used by a user in the network. The vector, which may also be referred to as a behavioral vector, is not merely a sample of user traffic; instead, the behavioral vector is a compact representation of a hierarchical bag for the given user. A hierarchical bag is a dataset that includes network telemetry data (i.e., all network flows to domains, servers, or other such Internet end-points) for a given user over a period of time. The behavioral vector provides insight into the interconnections or relationships between different network traffic flows for a given user over a period of time. The single behavioral vector is generated from unlabeled feature vectors and, thus, the vector is generated without time and cost-intensive labeling operations. In other words, the techniques presented herein avoid workload issues/inefficiencies associated with traditional learning algorithms. For example, there is no need to annotate specific connections or log entries for a given user. In fact, in at least some instances, a single behavioral vector can be generated without any knowledge of flow-level infections, connection-level infections or even user-level infections. That being said, in some instances, user-level labels may be utilized to select particular operators, which are utilized to generate the single behavioral vector, as is discussed in further detail below.

Put another way, the techniques presented herein transform a complex user traffic structure (a hierarchical bag) into vectorial form, effectively obtaining a user's behavioral fingerprint. The transformation is lightweight and is not dependent on a particular prediction model. At least because the techniques create a behavioral vector for a user based on all of the user's traffic over a given time period, the techniques are suitable, if not preferable, for a range of tasks, such as training classifiers to detect infected users and discovering groups of users with similar behavior.

More specifically, since the techniques presented herein generate a single behavioral vector for a given user, the techniques can provide classification models/algorithms with significantly improved training as compared to samples or vectors that are conventionally used with these models/algorithms. As one example, the techniques presented herein may generate behavioral vectors for a plurality of users (one vector per user) and an arbitrary classification model and/or detection system can be then trained on top of the generated behavioral vectors. However, in different situations, the underlying parameters or elements of the behavioral vector may be adjusted or altered to summarize relevant information for any underlying classification task, such as classification of users within an enterprise network based on roles or groups. In other words, generally, the techniques presented herein enable behavioral fingerprinting of users in a computer network with a single vector. Elements in the vector may express common patterns of behavior that can distinguish the user in any number of ways, including distinguishing a user as infected or benign.

That being said, when the techniques presented herein are used to train a classification or detection system for infections (such as malware infections), user-level labels may be applied to the behavioral vectors, but the underlying data need not be labeled. That is, a hierarchal bag (which, as mentioned, is a dataset including all network flows to domains for a given user and, thus, includes feature vectors for sets of flows for each connection for the user during a period of time) has (only) a single label for a particular time period. Put still another way, with the techniques presented herein, a classifier may be trained to detect infections with only knowledge of whether users were infected in a particular time period (i.e., a classifier may be trained with weakly labeled data, insofar as connection- or user-level labels are commonly referred to weak labels because these labels are often not suitable for training learning algorithms).

By comparison, many traditional techniques select a single feature vector from a single traffic flow or a single connection of a user's telemetry data as representative of the user's behavior. That is, conventional techniques often select a single feature vector representative of one flow to one domain for one connection or one connection to one domain (out of tens, if not hundreds of flows to a multitude of connections in a hierarchical bag for a particular user) to represent a given user's behavior for classifier training. Consequently, the context of the whole user activity is not taken into consideration in the representation and the resultant classifier may be unable to discover at least some network threats. For example, on its own, a connection to searchengine.com provides no indication of maliciousness, but if this connection is seen among other weak indicators of maliciousness, the connection may be the missing piece of evidence needed to identify a network threat (i.e., threats where the malicious activity is spread among multiple flows/connections). As another example, a connection may not be a direct symptom of an infection (and only a subset of the flows associated with the connection may be associated with the infection), so a connection-level flow may not provide enough information to identify an infection. As still another example, when users are infected with click-fraud malware, analyzing flows one by one will not identify an increased number of flows targeting to advertisements domains.

Moreover, in order to use a single feature vector from a single traffic flow to train a classifier, individual traffic flows are labeled (as opposed to higher level labels, like connections or users). Since there are exponentially more traffic flows than connections (and exponentially more connections than users), labeling traffic flows is an expensive process that does not scale. The same can be said for labeling connections. Moreover, in many cases, it is difficult or even impossible to identify all log records (i.e., traffic flows) responsible for an infection because malware and user background activity can blend within the same period of time. Thus, annotating all log records for a particular connection or a particular user with the same label may be incorrect.

Reference is first made to FIG. 1 for a description of a network environment 100 in which the techniques presented herein may be employed, according to at least one example embodiment. In FIG. 1, network traffic 152 between a computer network 110 (i.e., an enterprise network) and external domains 120, 130 is depicted. Domains 120, 130, may be devices such as, as servers (e.g., web servers, and the like) with which computers within the computer network 110 communicate. The computer system 113 in computer network 110 may initiate communication with, e.g., computer system 123 of domain 120 through a gateway or proxy device 115 that is connected to the Internet 150. That same traffic 152, in the form of packet flows 154, may also be provided to a central server computer 117.

In at least some embodiments, the gateway device 115 may include behavioral vector logic 200 configured to classify a user (i.e., to classify the user as infected and detect a network threat) based on an analysis of telemetry data associated with the user. In these embodiments, as the traffic 152 is received by gateway device 115, the behavioral vector logic 200 may analyze features extracted from the traffic 152 using the techniques described herein. In some instances, the behavioral vector logic 200 extracts the features in accordance with feature extraction techniques now known or developed hereafter, but in other instances, the behavioral vector logic 200 receives features once the features are extracted from the network traffic 152.

Additionally or alternatively, the behavioral vector logic 200 (or a portion thereof) may be hosted in a separate computer system such as central server computer 117. In this configuration, the behavioral vector logic 200 may import packet flow log data or files ("logs") and/or features extracted from the network traffic 152. Alternatively, the behavioral vector logic can receive packet flows 154 directly from the network 110. As a more specific example, the behavioral vector logic 200 may receive data with a hierarchical bag structure (e.g., proxy logs or NetFlow records) from gateway device 115, which is explained in further detail below in connection with FIG. 2. The data may include extracted features or network traffic data that allows the behavioral vector logic 200 to extract features. As mentioned above, the behavioral vector logic 200 may obtain features in accordance with any feature extraction techniques now known or developed hereafter.

In an example of a network threat incident, computer system 140, also connected to Internet 150, may be a source of a network attack. That is, computer system 140 may be configured to spoof domains 120 and 130. Those skilled in the art will appreciate that domains 120 and 130 may, however, themselves, be a source of a network attack, which may have been able to penetrate computer network 110. Thus, the packet flows from computer system 123 (or 140) to enterprise computer system 113 may contain malicious network attack packets.

Figure 2:
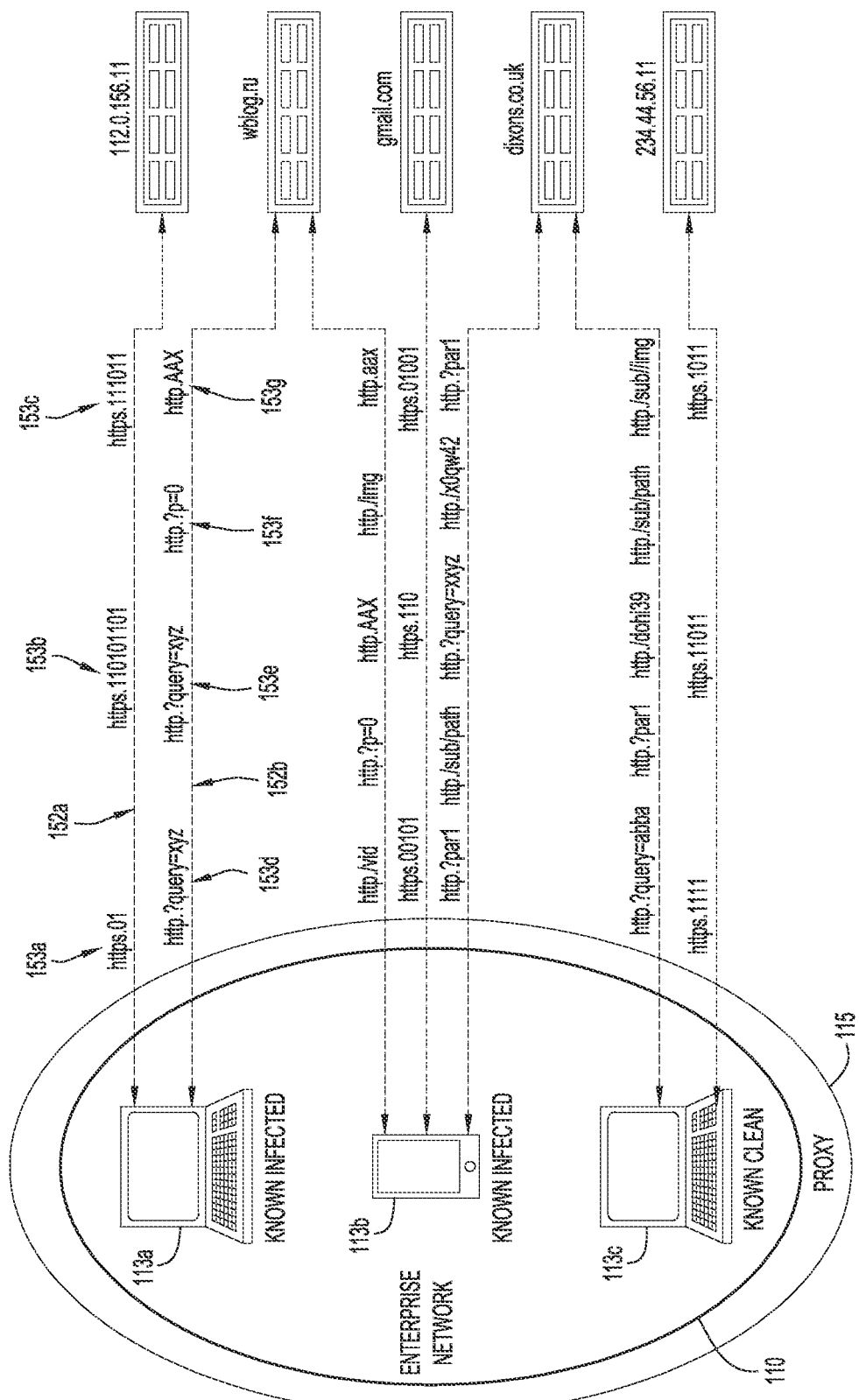
FIG. 2 is a representation of traffic flowing between computers within a computer network and multiple external domains over a specific period of time, with each computer's traffic being organized into a hierarchical bag in accordance with an example embodiment.

FIG. 2 is a representation of traffic flowing between computers 113*a*, 113*b*, 113*c* within computer network 110 and multiple external domains, with individual flows. The individual flows from multiple domains to a given single user can be aggregated or organized as a hierarchical bag in accordance with an example embodiment. That is, the traffic flows, which are the subject of the classification techniques data presented herein, have an inherently complex structure that is referred to herein as a hierarchical bag. The structure reflects the fact that a user can establish a communication with an arbitrary number of end-points (i.e., servers or domains) and each communication can include a variable number of traffic flows (e.g., entries in proxy logs or NetFlows). In FIG. 2, connections are depicted as lines (hashed lines) and traffic flows are the data segments included on a line in order to depict the aforementioned structure. For example, computer 113*a* include connections 152*a* and 152*b*, with connection 152*a* including traffic flows 153*a*, 153*b*, and 153*c* and connecting 152*b* including traffic flows 153*d*, 153*e*, 153*f*, and 153*g*. For simplicity, the remaining connections and traffic flows are unlabeled; however, it is to be understood that the other hashed lines and data segments in FIG. 2 also represent connections and traffic flows.

Feature vectors having a fixed length may be extracted from each of the traffic flows (i.e., from each traffic flows 153*a*, 153*b*, and 153*c* for connection 152*a*) so that a hierarchical bag for a user includes a set of sets of vectors. That is, a hierarchical bag for a user includes a set of vectors for the user's connections, each of which includes a subset of feature vectors for the traffic flows included in that connection.

More specifically, for a given period of time, a user U (represented by a computing device 113*a*, 113*b*, or 113*c* in FIG. 2) can establish a communication with a number m of end points, where m∈N, such that $U=\{C_1, C_2, \ldots, C_m\}$, with C representing a communication between the user and the contacted end point. As mentioned in connection with FIG. 1, the communication is typically monitored by a gateway system (i.e., gateway system 115) located on the perimeter of the computer network and captured in the form of logs (also called flows). Since usual communication includes several actions (i.e., in the case of connection over Hypertext Transfer Protocol (HTTP), visiting sub-pages of a visited website, downloading JavaScripts, style sheets, images, etc.), one such communication might generate many log entries, such that $C=\{x_1, x_2, \ldots, x_n\}$, where n∈N.

A fixed number of features d, where d∈N, is extracted from each log entry so that a feature vector x of length d is generated for each log entry (traffic flow). That is, $x \in R^d$ and d is constant across all feature vectors. In other words, $x=(f_1, f_2, \ldots, f_d)$, where $f_i$ denotes i-th feature out of d extracted features. However, it is important to note that while the number d is constant for all feature vectors, variables m and n may vary from user to user and across individual connections. As a result, a hierarchical bag for user U is a set of sets including all feature vectors describing the user activity within the given period of time structured into subsets according to contacted end points:

$U=\{\{x_1^1, x_2^1, \ldots\}\{x_1^2, x_2^2, \ldots\}, \ldots\}$, where the indexing $x_l^c$ means that the feature vector of the particular user belongs to its connection $C_c$; where c∈N and is extracted from the l-th log entry, where l∈N.

Figure 3:
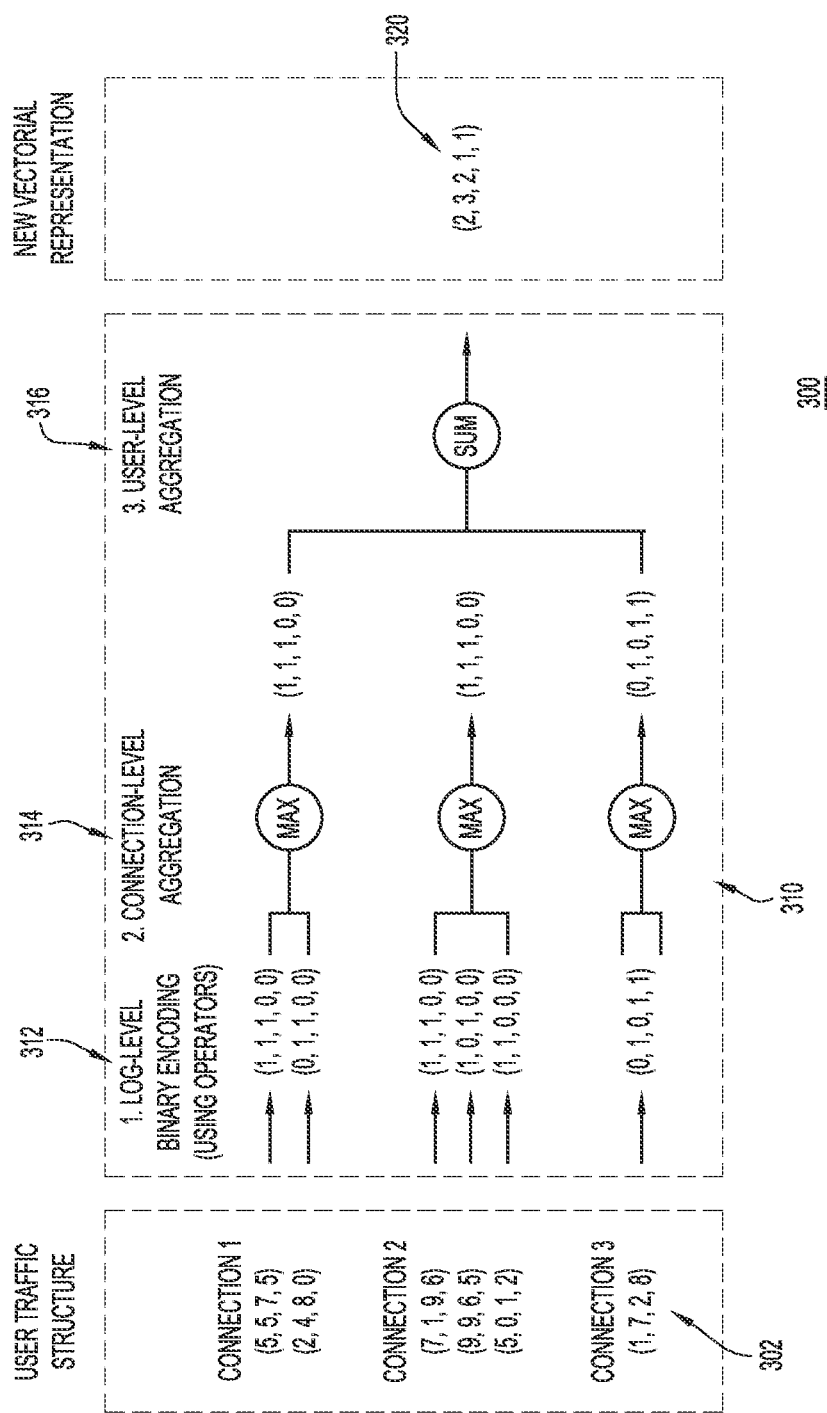
FIG. 3 is a diagram depicting, at a high-level, operations for generating a vector representative of user behavior according to an example embodiment.

Now referring to FIG. 3 for a description of a diagram 300 that depicts the techniques presented herein at a high-level. As explained above, these techniques may be performed at a gateway system or a computing device connected to the gateway system, but for purposes of generality, the operations depicted in diagram 300 are described as being performed at an apparatus.

Initially, at 302, an apparatus receives a hierarchical bag with features vectors that have been extracted from user traffic for a specific period of time. In the depicted embodiment, the user established three connections (i.e., with different domains or Internet Protocol (IP) addresses) within the specific period of time: Connection 1; Connection 2; and Connection 3. Each of the connections includes a variable number of log records (i.e., traffic flows or, more specifically, HTTP requests for a Uniform Resource Locator (URL). In FIG. 3, each of the log records is represented on a different line (i.e., row) beneath its respective connection. Thus, Connection 1 includes two log records, Connection 2 includes three log records, and Connection 3 includes one log record.

In FIG. 3, each log record is represented by a feature vector with four numerical elements so that the length of the feature vectors is constant across the traffic flows, both within and between connections. Within the feature vector, each numerical element (i.e., each feature value) represents a different feature. For example, each numerical element may be representative of any number of parameters associated with a requested URL/HTTP request, such as bytes received, bytes sent, duration of a connection, n-gram statistics from URL strings, etc. However, the length of the feature vectors, the number of log records, the number of connections and any other hierarchal bag variables shown in FIG. 3 are merely intended to depict the techniques presented herein and real-world implementations of the techniques presented herein may, for example, include significantly larger samples with significantly larger feature vectors.

At 310, the techniques presented herein operate on and/or analyze the received set of feature vectors in order to generate a single behavioral vector at 320. That is, the hierarchal bag is transformed into the single behavioral vector 320. Generally, the operations performed at 310 extract information about the connections in a user's activity that match certain patterns. The patterns are detected with a series of operators or predicates (i.e., functions) that work as indicators. In at least some embodiments, the operators are each binary operators or predicates with binary outputs, such that operators/predicates provide binary indicators. Once an indicator is turned on, the signal is propagated to the final vector. As one example, since an increased volume of a specific type of activity is a good indicator of compromise, various operators may analyze user activity (via the feature vectors) to identify increased activity of various types (i.e., the operators may verify whether a given flow (represented by the feature vector) satisfies a specific condition (i.e., a pattern)). As a more specific example, the operators may analyze the feature vectors to determine if there has been an increased volume of requests targeting advertisement domains, which may indicate that a computer associated with the user is infected with click fraud malware. Since click fraud malware may use legitimate traffic to enlarge advertisement revenues to the malware creators or to deplete a competitor's advertising budget, it is typically not detectable by a detector operating on the level of isolated log records or connections (i.e., because visiting one ad-domain is considered as legitimate behavior). Here, the context provided by all user activity allows the techniques to detect nuanced, polymorphic, and other threats that are often undetectable.

More specifically, at 310, three operations are performed on the set of feature vectors included in the received hierarchical bag. First, at 312, the received set of feature vectors is analyzed with a set of operators, such as binary operators, to generate per-flow vectors that represent each received feature vector. The operators are described in further detail below in connection with FIG. 4. Generally, the operators produce per-flow vectors that are not necessarily the same length as the received feature vector. In fact, the per-flow vectors may be longer than the received feature vector in order to fully analyze the received future vectors (the length of the per-flow vectors is based on the number of operators). However, all of the per-flow vectors are the same length across or within connections, so that each per-flow vector includes the same vector elements (because the vector elements are generated by the same set of operators).

At 314, the per-flow vectors are aggregated at a connection level using a maximum function to generate per-connection vectors. The maximum function behaves like a logical OR operator insofar as the function creates binary per-connection vectors by determining whether any of the per-traffic vectors for a given connection include a "1" in a particular position. For example, if any of the binary per-flow vectors for a given connection has a one in the first position of the vector, then the per-connection vector will also have a one in this position. If, instead, all values of the binary per-flow vectors for a given connection have a "0" in a particular position, the per-connection vector will be zero for that position. This operation is performed along the length of the vector for each connection.

Thus, in FIG. 3, the binary per-connection vector of (1, 1, 1, 0, 0) is generated for Connection 1 based on a maximum of the per-flow vectors (1, 1, 1, 0, 0) and (0, 1, 1, 0, 0). Similarly, a per-connection vector of (1, 1, 1, 0, 0) is generated for Connection 2 based on a maximum of the per-flow vectors (1, 1, 1, 0, 0), (1, 0, 1, 0, 0), and (1, 1, 0, 0, 0) while a per-connection vector of (0, 1, 0, 1, 1) is generated for Connection 3 based on a maximum of the per-flow vector (0, 1, 0, 1, 1)

Finally, at 316, the per-connection vectors are aggregated to generate a single behavioral vector 320 for the user 3. The per-connection vectors are aggregated on the user-level with a summation function that aggregates like vector elements across all of the per-connection levels, essentially counting the "ones" in each position of the per-connection vectors. Consequently, in FIG. 3, the per-connection vectors (1, 1, 1, 0, 0), (1, 1, 1, 0, 0), and (0, 1, 0, 1, 1) are aggregated to create a user-level behavioral vector of (2, 3, 2, 1, 1). This produces a compact behavioral vector that expresses the complex user traffic structure (hierarchical bag) with a single vector of a fixed dimension. As is explained in further detail below in connection with FIG. 4, this compact behavioral vector may be used to accurately and efficiently classify the user and/or a computing device associated with the user, such as to group the user into a group within an enterprise network (i.e., a specific team for a company) and/or to determine if the computing device is infected (i.e., a behavioral vector may include information about an increased volume of connections that have flows satisfying a particular condition that is indicative of an infection).

Figure 4:
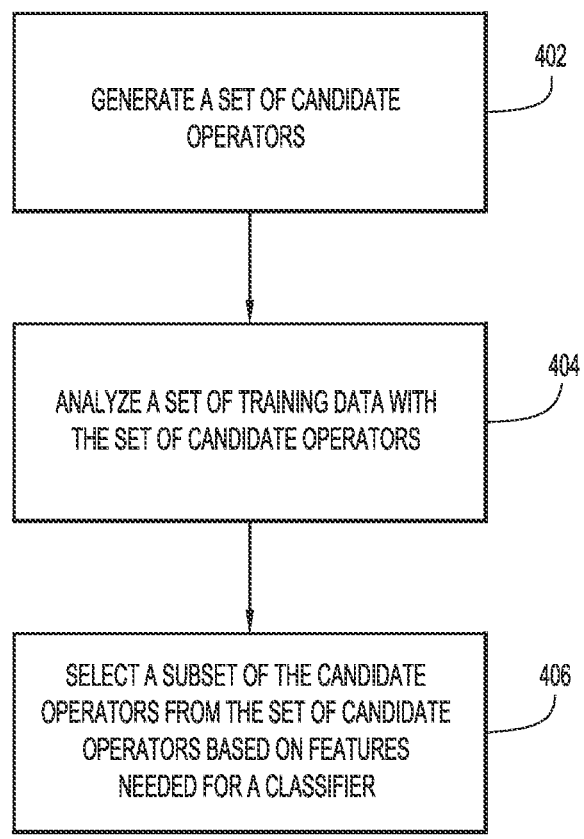
FIG. 4 is a flowchart illustrating a method for selecting operators for analyzing feature vectors included in a hierarchical bag, according to an example embodiment.

Now referring to FIG. 4, for a description of a flow chart of a method 400 depicting operations performed by a computer system to generate a set of operators (i.e., at 312 in FIG. 3). As mentioned above, the operators impose or test conditions against each of the received feature vectors. For instance, an operator can determine whether a specific feature value (i.e., the first feature value) of a given feature vector is greater than five. The same operators are used to analyze all of the received feature vectors; however, in different examples, different sets of operators may be applied to all of the received feature vectors. For example, the number of operators can differ from case to case, but in any use case, the operators transform the received feature vectors into per-flow vectors of equal length. In at least some embodiments, the per-flow vectors are binary vectors and, thus, each operator makes a binary determination based on one or more feature values included in a given feature vector. In at least some embodiments, the specific operators included in a set of operators are determined automatically, such as based on parameters of classification to be applied to the behavioral vector.

In one example, operators can be generated based on one of three logical inquiries: (1) is a specific feature value of a given feature vector equal to a certain value?; (2) is a specific feature value of a given feature vector greater than a certain value?; and (3) is a specific feature value of a given feature vector less or equal to a certain value? In other words, operators are governed by three parameters: the feature value; a sign of (in)equality; and a threshold value. A set of operators for a particular classification task may include any combination of operators that are utilizing (i.e., asking or applying) these logical inquiries.

FIG. 4 illustrates one example method 400 of selecting relevant set of operators for a particular classification task. In this example method, first, at 402, a set of candidate operators is generated. The candidate set by exhaustively applying the logical inquires as operators. For example, all relevant combinations of (in)equalities (i.e., equal to, greater than, less than, and combinations or negatives thereof) are applied to each feature value with one or more threshold value. This is viable for binary, categorical and discrete features whose sets of all possible values that the features can take have a reasonably limited size. In the case of continuous features, where the sizes would be infinite, or discrete features with a large number of possible values, their ranges as estimated from the data are quantized with a predefined density of quantization. For example, uniform quantization with 128 bins may be utilized.

At 404, a set of training data is analyzed with the set of candidate operators. That is, the set of candidate operators is used to transform training data (or a subset of training data) to per-flow vectors. Although the per-flow vectors may be relatively long (i.e., as long as the number of candidate operators), the per-flow vectors are still typically compact when compared to the full original representation from a hierarchical bag. Moreover, to store the new vectorial representation in computer memory, it is sufficient to use 8- or 16-bit unsigned integers, since users have rarely more than 255 or 65,535 unique connections within a reasonable short time period (e.g., five minute) that is utilized for the techniques presented herein.

Finally, at 406, a subset of relevant operators is selected from the set of all candidate operators based on features that are needed for a classifier for which the behavioral vectors are being generated. Generally, this allows the operators to be customized for any classifying or training operations. For example, one set of operators can be used to generate behavioral vectors suitable for training a classifier to group users from an enterprise network based on their roles and another set of operators may be used to generate behavioral vectors suitable for training a classifier to detect click fraud malware. The required subset can be determined using a Feature Selection (FS) technique now known or developed hereafter on the final behavioral vectors. For example, an FS technique called Conditional Mutual Information Maximization (CMIM) may be utilized. By comparison, applying learning algorithms to behavioral vectors generated using a candidate set might lead to overfitting and/or large training time, because there is an extensive mix of useful, redundant and irrelevant features.

Figure 5:
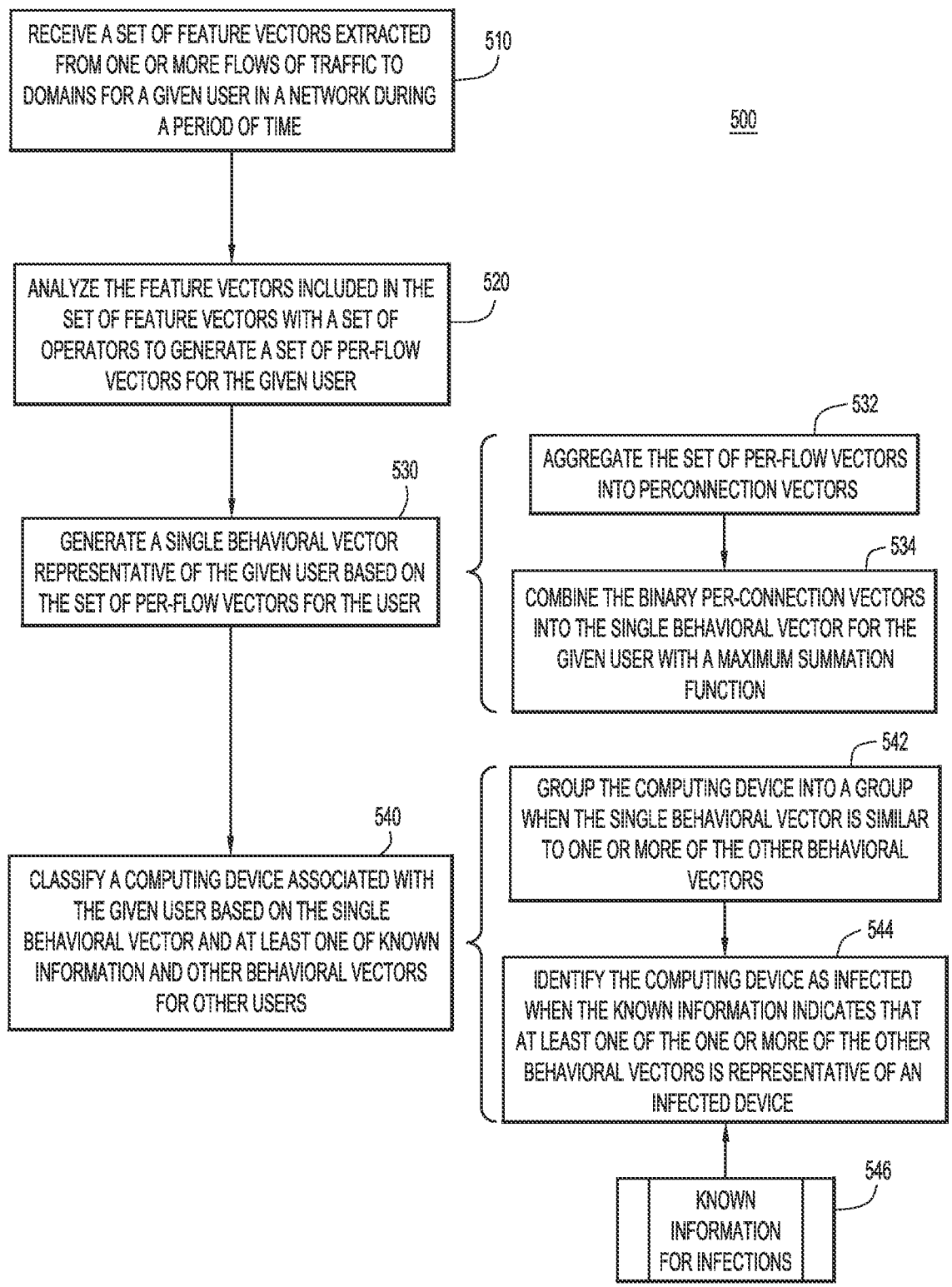
FIG. 5 is a high-level flowchart illustrating a method for generating a vector representative of user behavior, according to an example embodiment.

Referring next to FIG. 5 for a description of a high-level flow chart of a method 500 depicting operations performed by a computer system to generate a vector representative of user behavior. As explained above, this method may be performed at a gateway or a computing device connected to the gateway, but for purposes of generality, method 500 is described as being performed at an apparatus, that is, some apparatus in the system that has access to the data used for the processing described herein. At step 510, the apparatus receives a set of feature vectors extracted from one or more flows of traffic to domains for a given user in a network during a period of time. In at least some embodiments, the set of feature vectors may be a set of unlabeled feature vectors included in a hierarchical bag for the given user. As has been described herein (i.e., with respect to FIG. 2), the hierarchical bag is a dataset including feature vectors for each of the flows of traffic in each connection to the domains for the given user.

At 520, the apparatus analyzes the feature vectors included in the set of feature vectors with a set of operators to generate a set of per-flow vectors for the given user. In at least some embodiments, the operators are binary operators and each per-flow vector in the set of per-flow vectors is a binary per-flow vector. The operators may collectively perform any number of analyses on the received feature vectors so that the per-flow vectors can have various lengths in different embodiments (corresponding to the number of operators); however, in one embodiment, each per-flow vector has an identical length and each per-flow vectors includes elements created with the same operator in like positions.

At 530, the apparatus generates a single behavioral vector representative of the given user based on the set of per-flow vectors for the user. As is described above in connection with FIG. 3, generating may include two discrete steps, which are depicted at 532 and 534 of FIG. 5. First, at 532, the apparatus may aggregate the set of per-flow vectors into per-connection vectors (i.e., with a maximum function). Then, at 534, the apparatus may combine the per-connection vectors into the single behavioral vector for the given user (i.e., with a summation function). In embodiments where the per-flow vectors are binary (i.e., created by a set of binary operators), the per-connection vectors are also binary, but are combined by adding binary elements to create a behavioral vector that may have non-binary elements/values. Moreover, in embodiments with binary operators, the apparatus may utilize the maximum function to aggregate binary elements from like binary operators across the binary per-connection vectors into a single vector element.

At 540, the apparatus classifies a computing device associated with the given user based on the single behavioral vector and at least one of known information and other behavioral vectors for other users. To classify the computing device, the apparatus may, in at least some embodiments, again perform two discrete steps, which are depicted at 542 and 544. For example, in some instances, the apparatus may, at 542, group the computing device into a group when the single behavioral vector is similar to one or more of the other behavioral vectors. The similarity may be determined based on a similarity threshold (i.e., a similarity value determined with cosine similarity above a predetermined threshold) or any similarity measure used by any detector or classifier. At 544, the apparatus may identify the computing device as infected when known information (i.e., known information for infections provided at 546) indicates that at least one of the one or more of the other behavioral vectors is representative of an infected device. That is, a computing device associated with a user may be determined to be infected when the behavioral vector for the user is similar to a behavioral vector of an infected user or device.

Figure 6:
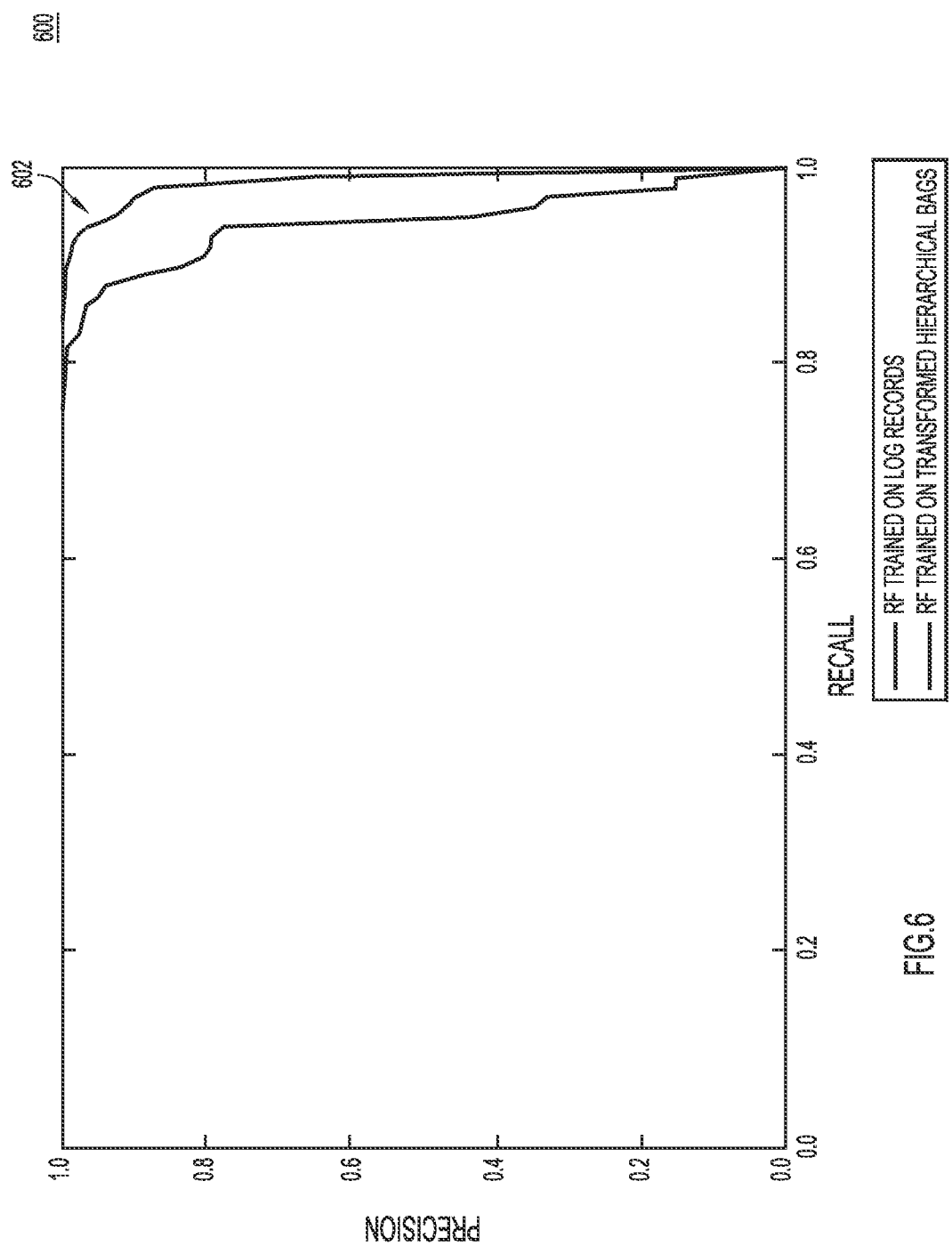
FIG. 6 is a diagram depicting infected users identified based on the techniques presented herein in comparison to users identified based on another technique.

Now referring to FIG. 6 for a description of a diagram 600 that depicts Precision-Recall results for a classification model trained with the techniques presented herein (i.e., a Random Forest (RF) with transformed hierarchal bags) compared against the same classification model trained with a feature vector extracted from log records. More specifically, hierarchal bags covering five-minute intervals of proxy log data were transformed into behavioral vectors for the various users represented by the data (one vector per user) with the techniques presented herein. Then, these behavioral vectors were correlated with known information indicating whether the users were associated with an infected or benign computing device in order to train the RF. Meanwhile, another instance of the same RF was trained with individual feature vectors extracted from the proxy log records (i.e., the RF was also trained in accordance with conventional techniques).

Before turning to the results, it is noted that the classification model trained on transformed hierarchical bags was supplied with only approximately one-tenth of the number of positive labels needed to train the baseline model. This is because there is no need to label all log records inside the hierarchical bags. It is enough to provide user-level labels only (i.e. one label per bag). Thus, even before addressing the results, the techniques presented herein are advantageous because they drastically reduce the amount of information and time needed for training. Moreover, as is shown in FIG. 6, the techniques presented herein significantly outperformed the congenital techniques. At least because, as shown at 602, the techniques presented herein provide increased precision and recall, even when a user was considered to be positively identified by the RF trained on log records when at least one of its log records was classified as positive (because the baseline RF method classifies log records instead of users).

Figure 7:
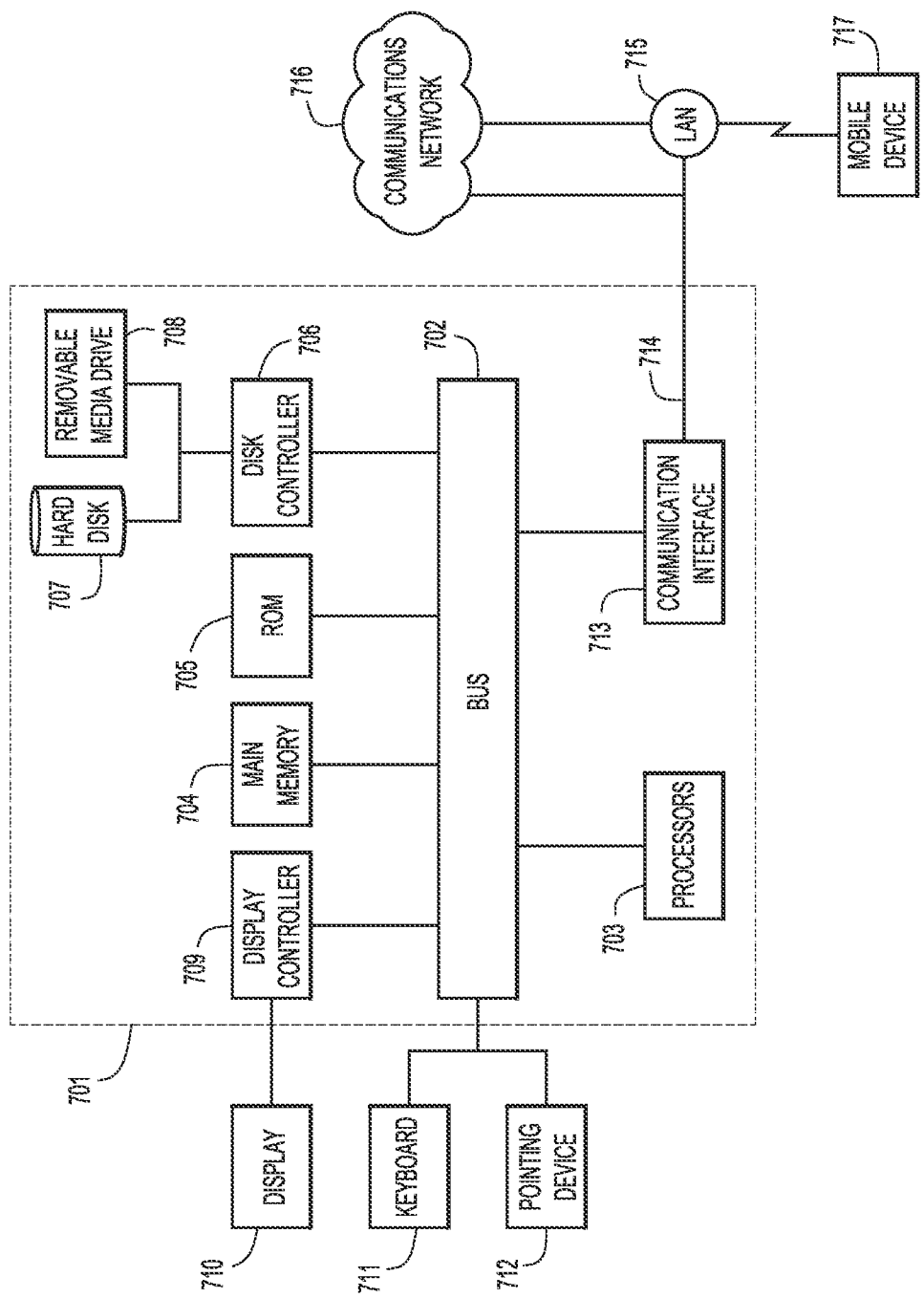
FIG. 7 is a block diagram that illustrates a computer system or apparatus in which the techniques presented herein may be implemented.

FIG. 7 depicts a block diagram of an apparatus that is configured to operate as a security analysis device or apparatus that hosts behavioral vector logic 200 according to an example embodiment. The apparatus may be implemented on a computer system 701. The computer system 701 may be programmed to implement a computer based device. The computer system 701 includes a bus 702 or other communication mechanism for communicating information, and a processor 703 coupled with the bus 702 for processing the information. While the figure shows a single block 703 for a processor, it should be understood that the processor 703 represents a plurality of processors or processing cores, each of which can perform separate processing. The computer system 701 may also include a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703. Main memory may also be used to store logic instructions or software for performing the operations shown in FIGS. 3-5.

The computer system 701 may further include a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 may also include a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a liquid crystal display (LCD), light emitting diode (LED) display, etc., for displaying information to a computer user. The computer system 701 may include input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing operations of the embodiments described herein in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the described embodiments, and for enabling the computer system 701 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716. For example, the communication interface 713 may be a wired or wireless network interface card or modem (e.g., with SIM card) configured to attach to any packet switched (wired or wireless) LAN or WWAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local area network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection to a mobile device 717 such as a personal digital assistant (PDA) laptop computer, cellular telephone, or modem and SIM card integrated with a given device.

In summary, in one form, a method is provided comprising: receiving, at a security analysis device, a set of feature vectors extracted from one or more flows of traffic to domains for a given user in a network during a period of time; analyzing the feature vectors included in the set of feature vectors with a set of operators to generate a set of per-flow vectors for the given user; generating a single behavioral vector representative of the given user based on the set of per-flow vectors for the user; and classifying a computing device associated with the given user based on the single behavioral vector and at least one of known information or other behavioral vectors for other users.

In another form, an apparatus is provided comprising: a network interface unit configured to enable communications via a network; a memory configured to store logic instructions; and a processor, when executing the logic instructions, configured to receive a set of feature vectors extracted from one or more flows of traffic to domains for a given user in a network during a period of time; analyze the feature vectors included in the set of feature vectors with a set of operators to generate a set of per-flow vectors for the given user; generate a single behavioral vector representative of the given user based on the set of per-flow vectors for the user; and classify a computing device associated with the given user based on the single behavioral vector and at least one of known information or other behavioral vectors for other users.

In still another form, one or more non-transitory computer readable storage media are provided encoded with software comprising computer executable instructions and when the software is executed operable to: receive a set of feature vectors extracted from one or more flows of traffic to domains for a given user in a network during a period of time; analyze the feature vectors included in the set of feature vectors with a set of operators to generate a set of per-flow vectors for the given user; generate a single behavioral vector representative of the given user based on the set of per-flow vectors for the user; and classify a computing device associated with the given user based on the single behavioral vector and at least one of known information or other behavioral vectors for other users.

A number of advantages are achieved via the methods, device(s), and computer readable media described herein. For example, and perhaps most notably, the techniques herein provide sophisticated and computationally efficient classification or classification training operations. This allows for superior detection of advanced malware as compared to conventional techniques. The detection is superior at least because a prediction made by a classification model trained with behavioral vectors generated with the techniques presented herein is based on a global view of user behavior. That is, a discriminative rule resolving whether a user is infected might use information about a set of specific user's actions, repeatedly established connections or a context of the user activity within the given time window. Therefore, the classifier can learn and apply more complex patterns about the behavior of infected users than in the case of isolated connections or log records.

Furthermore, the techniques presented herein are largely independent. For example, the techniques presented herein can be executed independent from an applied classification model and a multitude of arbitrary learning algorithms, like Random Forests, Neural Networks, Support Vector Machines, etc. can be employed on top of the generate behavioral vectors. As another example, the techniques may be executed independent of the type of network data or a set of features extracted from the data. Any data with the hierarchical bag structure can be potentially used (e.g., proxy logs, NetFlows, but also system calls, file system structure, etc.). As yet another example, the techniques may be executed independent of the final task for which they are intended and, thus, can be used in a variety of tasks related to supervised learning and network telemetry data, where the subject is a user (i.e., node) of a computer network.

Moreover, as has been repeatedly mentioned, the techniques presented herein do not require log-level or connection-level labeling. Instead, the techniques presented herein can be used without any labels (e.g., to find groups of users with similar behavior) or in combination with only top-level (i.e., user-level) labels for user classification (e.g., infection detection). This provides a significant cost reduction and significantly reduces the need for human intervention. Often, a lack of labeled data is one of the key limitations in network security. The techniques presented herein not only dramatically reduce the number of entities that need to be annotated, but also make the process much easier at least because analysts do not have to pinpoint isolated log entries or connections responsible for an infection. Notably, user labels are relatively easy to generate as compared to traffic flow-level labels, which are often difficult or even impossible to generate because individual signals may not carry enough discriminatory information. In fact, the techniques presented herein may expand the universe from which labels can be drawn. That is, user-level labeling enables a labeling entity to use a completely separate source of data. For example, an antivirus report or a screenshot of cryptolocker malware from the user's computer may prove a user's computer was or is infected during a specific time frame.

The above description is intended by way of example only. Various modifications and structural changes may be made therein without departing from the scope of the concepts described herein and within the scope and range of equivalents of the claims.

What is claimed is:

1. A method comprising:
receiving, at a security analysis device, a set of feature vectors extracted from one or more flows of traffic to domains for a given user in a network during a period of time;
analyzing feature vectors included in the set of feature vectors with a set of operators to generate a set of per-flow vectors for the given user, wherein the set of feature vectors includes feature vectors representative of flows of traffic for the given user to at least two different domains;
generating a single behavioral vector representative of the given user based on the set of per-flow vectors for the given user; and
classifying a computing device associated with the given user based on the single behavioral vector and at least one of known information or other behavioral vectors for other users, wherein the classifying is performed by a classifier model that is trained using a set of training single behavioral vectors, each training single behavioral vector being representative of flows of traffic corresponding to a particular user.

2. The method of claim 1, wherein the set of feature vectors is included in a hierarchical bag for the given user and is comprised of feature vectors that are unlabeled with respect to maliciousness, and wherein the hierarchical bag is a dataset including feature vectors for each of the one or more flows of traffic in each connection to the domains for the given user.

3. The method of claim 1, wherein operators in the set of operators are binary operators and each per-flow vector in the set of per-flow vectors is a binary per-flow vector to form a set of binary per-flow vectors.

4. The method of claim 3, wherein the generating further comprises:
aggregating the set of binary per-flow vectors into binary per-connection vectors; and
combining the binary per-connection vectors into the single behavioral vector for the given user.

5. The method of claim 4, wherein combining comprises:
using a maximum function to aggregate binary elements from like binary operators across the binary per-connection vectors into a single vector element.

6. The method of claim 1, wherein the single behavioral vector includes an element for each operator in the set of operators so that a length of the single behavioral vector corresponds to a number of operators included in the set of operators.

7. The method of claim 1, wherein classifying comprises:
grouping the computing device into a group when the single behavioral vector is similar to one or more of the other behavioral vectors.

8. The method of claim 7, further comprising:
identifying the computing device as infected when the known information indicates that at least one of the one or more of the other behavioral vectors is representative of an infected device.

9. An apparatus comprising:
a network interface unit configured to enable communications via a network;
a memory configured to store logic instructions; and
a processor, when executing the logic instructions, configured to
receive a set of feature vectors extracted from one or more flows of traffic to domains for a given user in the network during a period of time, wherein the set of feature vectors includes feature vectors representative of flows of traffic for the given user to at least two different domains;
analyze feature vectors included in the set of feature vectors with a set of operators to generate a set of per-flow vectors for the given user;
generate a single behavioral vector representative of the given user based on the set of per-flow vectors for the given user; and
classify a computing device associated with the given user based on the single behavioral vector and at least one of known information or other behavioral vectors for other users, wherein the classifying is performed by a classifier model that is trained using a set of training single behavioral vectors, each training single behavioral vector being representative of flows of traffic corresponding to a particular user.

10. The apparatus of claim 9, wherein the set of feature vectors is included in a hierarchical bag for the given user and is comprised of feature vectors that are unlabeled with respect to maliciousness, and wherein the hierarchical bag is a dataset including feature vectors for each of the one or more flows of traffic in each connection to the domains for the given user.

11. The apparatus of claim 9, wherein operators in the set of operators are binary operators and each per-flow vector in the set of per-flow vectors is a binary per-flow vector to form a set of binary per-flow vectors.

12. The apparatus of claim 11, wherein to generate the single behavioral vector, the processor is further configured to:
aggregate the set of binary per-flow vectors into binary per-connection vectors; and
combine the binary per-connection vectors into the single behavioral vector for the given user.

13. The apparatus of claim 9, wherein the single behavioral vector includes an element for each operator in the set of operators so that a length of the single behavioral vector corresponds to a number of operators included in the set of operators.

14. The apparatus of claim 9, wherein to classify the computing device, the processor is further configured to:
group the computing device into a group when the single behavioral vector is similar to one or more of the other behavioral vectors; and
identify the computing device as infected when the known information indicates that at least one of the one or more of the other behavioral vectors is representative of an infected device.

15. One or more non-transitory computer readable storage media encoded with software comprising computer executable instructions and when the software is executed operable to:
receive a set of feature vectors extracted from one or more flows of traffic to domains for a given user in a network during a period of time, wherein the set of feature vectors includes feature vectors representative of flows of traffic for the given user to at least two different domains;
analyze feature vectors included in the set of feature vectors with a set of operators to generate a set of per-flow vectors for the given user;
generate a single behavioral vector representative of the given user based on the set of per-flow vectors for the given user; and
classify a computing device associated with the given user based on the single behavioral vector and at least one of known information or other behavioral vectors for other users, wherein the classifying is performed by a classifier model that is trained using a set of training single behavioral vectors, each training single behavioral vector being representative of flows of traffic corresponding to a particular user.

16. The non-transitory computer readable storage media of claim 15, wherein the set of feature vectors is included in a hierarchical bag for the given user and is comprised of feature vectors that are unlabeled with respect to maliciousness, and wherein the hierarchical bag is a dataset including feature vectors for each of the one or more flows of traffic in each connection to the domains for the given user.

17. The non-transitory computer readable storage media of claim 15, wherein operators in the set of operators are binary operators and each per-flow vector in the set of per-flow vectors is a binary per-flow vector to form a set of binary per-flow vectors.

18. The non-transitory computer readable storage media of claim 17, wherein the instructions operable to generate, further comprise instructions operable to:
- aggregate the set of binary per-flow vectors into binary per-connection vectors; and
- combine the binary per-connection vectors into the single behavioral vector for the given user.

19. The non-transitory computer readable storage media of claim 15, wherein the single behavioral vector includes an element for each operator in the set of operators so that a length of the single behavioral vector corresponds to a number of operators included in the set of operators.

20. The non-transitory computer readable storage media of claim 15, wherein the instructions operable to classify further comprise instructions operable to:
- group the computing device into a group when the single behavioral vector is similar to one or more of the other behavioral vectors; and
- identify the computing device as infected when the known information indicates that at least one of the one or more of the other behavioral vectors is representative of an infected device.

\* \* \* \* \*